Feb. 10, 1948.  V. WEBER  2,435,641
ELECTRIC HEATING SYSTEM FOR COOKING APPLIANCES
Filed June 29, 1944

INVENTOR
Victor Weber.
BY
Albert J. Henderson
HIS ATTORNEY

Patented Feb. 10, 1948

2,435,641

UNITED STATES PATENT OFFICE 2,435,641

ELECTRIC HEATING SYSTEM FOR COOKING APPLIANCES

Victor Weber, Greensburg, Pa., assignor to Robertshaw Thermostat Company, Youngwood, Pa., a corporation of Pennsylvania Application June 29, 1944, Serial No. 542,682

3 Claims. (Cl. 219—20)

This invention relates to an electric circuit for the heating elements of cooking appliances and, more particularly, to the control thereof to give various connections to the electric circuit for preheating, baking and broiling operations.

One object of the invention is to permit the appliance to be operated in all cooking conditions from a two-wire power system.

Another object of the invention is to utilize an auxiliary baking element of inexpensive form which is never connected at full line voltage.

Another object of the invention is to operate both top and bottom oven heating elements during a baking operation with a greater amount of heat emanating from the bottom.

Figure 1:
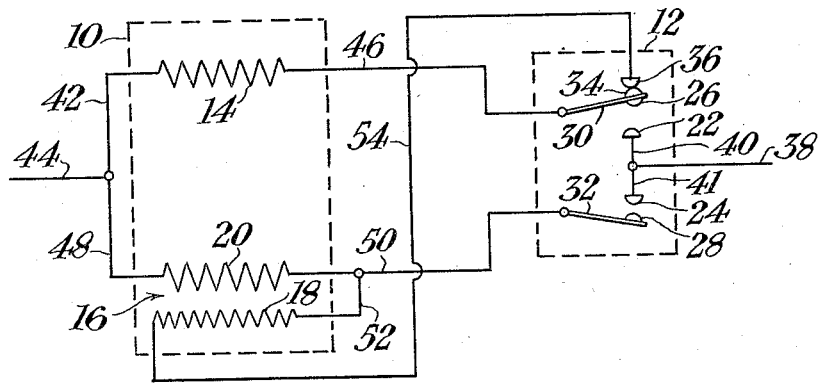
Figure 2:
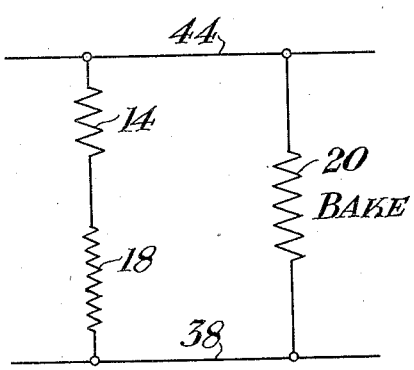
Figure 3:
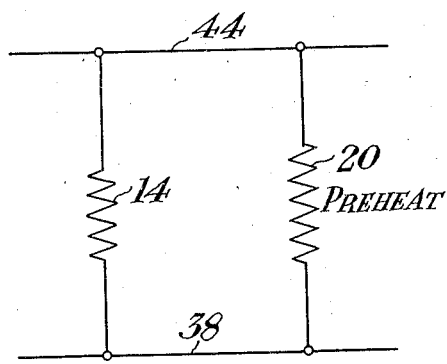
Figure 4:
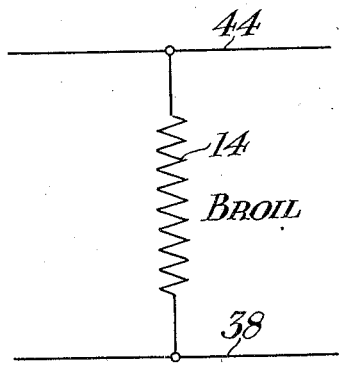

Other objects and advantages will become apparent from the following description taken in connection with the accompanying drawings, wherein Fig. 1 is a schematic view of a cooking appliance and switching mechanism embodying this invention; and Figs. 2, 3 and 4 are wiring diagrams showing the electric circuits for bake, pre-heat and broil operations, respectively.

Referring more particularly to the drawings, the cooking appliance is shown in Fig. 1 in broken lines in the form of an oven 10 having a switch housing 12 associated therewith and also shown in broken lines as the constructional form of either is immaterial for the purposes of this invention. The heating devices comprise a broiling element 14, shown as located in the upper portion of the oven 10, and a multi-part baking element 16 shown as located in the lower portion thereof. One part 18 of the multi-part baking element 16 is preferably of higher resistance value than the other part 20 thereof.

The switch housing 12 may be of any suitable type containing switching mechanism arranged for manual, thermostatic or any other desired form of operation. In this embodiment, the mechanism comprises two fixed contacts 22 and 24 spaced one from the other for cooperation with a pair of movable contacts 26 and 28, carried on a pair of movable switch arms 30 and 32, respectively. In addition, the switch arm 30 is provided on the side opposite the contact 26 with contact 34 which is movable into and out of engagement with a fixed contact 36 upon movement of the switch arm 30.

The contacts 22—24 are connected to one line wire 38 of a source of electric power by wires 40 and 41 respectively. One end of the broiling element 14 is connected by a wire 42 to the other line 44 of the two-wire power system and the opposite end of the broiling element 14 is connected by a wire 46 to the switch arm 30. Similarly, one end of the part 20 of the multi-part baking element 16 is connected by a wire 48 to line wire 44 and the opposite end thereof is connected by a wire 50 to the switch arm 32. The other part 18 of the multi-part baking element 16 is connected at one end by a wire 52 to wire 50 and at the opposite end thereof is connected by a wire 54 to the fixed contact 36.

The switching mechanism is shown in the "off" position in Fig. 1, wherein both the broiling element 14 and the multi-part baking element 16 are disconnected from the source of electric power. In Fig. 2 the elements are shown as connected to the line for a baking operation which is accomplished by leaving contact arm 30 in the position shown in Fig. 1 and moving contact arm 32 to engage contacts 24—28. In this bake position it will be apparent that the part 18 of the multi-part bake element 16 having the high resistance value is connected to the source of electric power in series circuit with the broiling element 14 and the other part of the multi-part baking element 16 is connected in parallel therewith.

The purpose of the high resistance element 18 is now apparent as for reducing the current value to the broil element 14. By properly proportioning the part 18 a desired amount of heat capacity can be obtained in the broil element 14 during the bake operation. Moreover, the part 18 serves to increase the emitted heat in the bottom of the oven 10 which would otherwise be solely governed by the capacity of the part 20.

In the preheat position of the switch mechanism the heating elements are connected to the line as shown in Fig. 3 of the drawings, the contacts 24—28 remaining engaged while the switch arm 30 is in position to engage contacts 26—22. Thus, only the part 20 of the multi-part bake element 16 is connected to the source of electric power by line wires 44—38 and the broil element 14 is connected in parallel therewith. As the part 20 and the broil element 14 are thereby connected at full line voltage the oven 10 can be brought quickly up to temperature during this operation.

To conduct a broil operation, the broil element 14 only is connected to the lines 38 and 44 as shown in Fig. 4. The multipart bake element 16 is disconnected in this position by operating switch arm 32 for opening the contacts 24—28 while contacts 26—22 remain engaged. The heat which is available in this operation emanates from the broil element 14 and is thus concentrated at the upper portion of the oven 10 as is required for broiling purposes.

It will be observed from the foregoing description of the various cooking operations that the part 18 of the multi-part baking element 16 is never connected at full line voltage and is used only during the baking operation. This part 18 can therefore be of inexpensive construction compared with the other part 20 of the multi-part bake element 16 and the broil element 14 which are constructed of the more ordinary oven heating element form adapted to carry the full line voltage. As disclosed herein, the electric circuit is adapted for use in conjunction with cooking appliances having a two-wire power system but it will be understood that a three-wire system could be used if desired. Moreover, many changes can be made in the arrangement and combination of parts and in the details of construction herein disclosed within the scope of the appended claims without departing from the spirit of the invention.

I claim:

1. In an electric circuit for cooking appliances having a source of electric power, the combination of a multi-part baking element, a broiling element, and switching means arranged in one position thereof to connect both said elements to the source, in another position thereof to connect only one part of said multi-part element and said broiling element to the source in parallel, and in a third position to connect only said broiling element to the source.

2. In an electric circuit for cooking appliances having a source of electric power, the combination of a multi-part baking element, a broiling element, and switching means arranged in one position thereof to connect one part of said multi-part element to the source in series circuit with said broiling element and another part of said multi-part element in parallel therewith, in another position thereof to connect only one part of said multi-part element to the source and said broiling element in parallel therewith, and in a third position to connect only said broiling element to the source.

3. In an electric circuit for cooking appliances having a source of electric power, the combination of a multi-part baking element adapted to be located in the lower portion of the appliance, one part of said element having a higher resistance value than the other, a broiling element adapted to be located in the upper portion of the appliance, and switching means arranged in one position thereof to connect said higher resistance part to the source in series circuit with said broiling element and said other part in parallel therewith, in another position thereof to connect only said other part to the source and said broiling element in parallel therewith, and in a third position to connect only said broiling element to the source.

VICTOR WEBER.

REFERENCES CITED

The following references are of record in the file of this patent:

UNITED STATES PATENTS

| Number | Name | Date |
|---|---|---|
| 2,218,778 | Weimer | Oct. 22, 1940 |
| 2,310,543 | Pearce | Feb. 9, 1943 |